June 13, 1944.  S. R. FRY  2,351,199
ELASTIC BAND, ARTICLE OF WEARING APPAREL EMBODYING
THE SAME AND THEIR METHOD OF PRODUCTION
Filed Aug. 10, 1939   9 Sheets-Sheet 1

INVENTOR:
Samuel R. Fry,
BY

June 13, 1944.　　　　　S. R. FRY　　　　　2,351,199
ELASTIC BAND, ARTICLE OF WEARING APPAREL EMBODYING
THE SAME AND THEIR METHOD OF PRODUCTION
Filed Aug. 10, 1939　　　9 Sheets-Sheet 6

INVENTOR:
Samuel R. Fry,
BY
ATTORNEY.

June 13, 1944. S. R. FRY 2,351,199
ELASTIC BAND, ARTICLE OF WEARING APPAREL EMBODYING
THE SAME AND THEIR METHOD OF PRODUCTION
Filed Aug. 10, 1939 9 Sheets-Sheet 7

INVENTOR:
Samuel R. Fry,
BY
ATTORNEY.

INVENTOR:
Samuel R. Fry.
BY
ATTORNEY.

Patented June 13, 1944

2,351,199

UNITED STATES PATENT OFFICE 2,351,199

ELASTIC BAND, ARTICLE OF WEARING APPAREL EMBODYING THE SAME, AND THEIR METHOD OF PRODUCTION

Samuel R. Fry, Wyomissing, Pa., assignor to The Narrow Fabric Company, West Reading, Pa., a corporation of Pennsylvania Application August 10, 1939, Serial No. 289,334

10 Claims. (Cl. 66—172)

This invention relates to novel elastic welts or bands as well as to articles of wearing apparel embodying the same, and to the novel method of their production.

The knitted sheer silk fabric of modern hosiery, while adequately elastic in the coursewise, or circumferential, direction to provide desired expansion or yieldability at all points, is recognized as having inadequate elasticity in the walewise or lengthwise direction for the attainment of certain desired results.

It has been proposed to provide one or more integrally knitted zones or bands of elastic yarn in a full length stocking between the knee area and the top thereof, to provide more lengthwise elasticity than is provided by the ordinary knitted fabric of inelastic yarn, thereby to lessen the severe, more or less local, strain on the fabric when flexing the knee. However, integrally knitted zones or bands of elastic yarn have proven to be difficult and expensive to make, generally requiring a modification of the machine, or the utilization of a special or modified loop formation, or both, to prevent unsightly curling of the elastic zone in the walewise direction resulting from unreleased tension in such zones when knitted of elastic rubber yarn.

It is an object of my invention to provide novel hosiery embodying an elastic area or zone which overcomes the mentioned and other difficulties of prior art hosiery constructions.

Another object of my invention is to provide a novel and economical method of making such novel hosiery.

Another object is to provide a novel elastic fabric, in the form of a welt, or band, for association with hosiery to provide additional walewise stretch, or for association with other articles to serve other purposes.

Another object is to provide an elastic band of this type having a section of relatively high transverse stretch per unit of transverse dimension, combined with low expansion resistance.

Another object of the invention is to provide such an elastic band which is substantially solid when relaxed, but which expands to an open mesh construction when stretched to the extent required in use.

Another object is to provide such an elastic band having a separately formed one way stretch portion and a separately formed universal stretch portion united by an inconspicuous seam, which band can be used, for example, either as a welt structure in articles of wearing apparel, such as hosiery and the like, or as an insert material in such articles.

A further object is to provide such an elastic band having, in conjunction with a universally elastic section, a circumferentially stretchable section of little or no transverse stretch of such construction as to cling to the skin of the wearer so as to resist displacement or shifting of the band.

A further object is to provide such an elastic band comprising two longitudinal portions or sections, both of which are longitudinally elastic, and one of which is universally elastic, the elasticity of each section being such as to provide the required stretch characteristics best adapted for the article with which the band is associated.

A further object is to provide a band having two sections at least partly elastic and joined by a seam simulating areas of the sections adjacent the seam.

In any of the foregoing bands the two sections may be made on the same type of machine or on entirely different types.

Braided, warp knitted or woven fabric sections may be joined to braided, warp knitted or woven fabric sections respectively, or the section formed on any one of the machines mentioned may be joined with one from either of the others. The connected sections of a given band, however, have different elastic characteristics in at least one respect.

It is also an object to provide a novel and economical method of making such elastic bands.

An additional object is to provide stockings having one or more bands embodying any one or more of the novel characteristics mentioned.

With these and other objects in view, which will become apparent from the following detailed description of the illustrative embodiment of the invention shown in the accompanying drawings, my invention resides in the novel methods of manufacturing stockings and elastic bands, as well as in the hosiery and elastic bands embodying the novel elements, features of construction and arrangement of parts in cooperative relationship, as hereinafter more particularly pointed out in the claims.

A stocking in accordance with my invention is generally of ordinary knitted fabric and in one form has the double ply welt usually provided on full length stockings. Below the top and preferably intermediate the knee and the top, the knitted fabric is interrupted and a separately formed two-way stretch elastic band is provided attached to the edges of the knitted fabric and adapted to provide not only the usual amount of coursewise stretch in the section of the stocking in which it is used, but also a greatly increased amount of walewise stretch compared to an equal length of ordinary stocking fabric. Such band is preferably at least partly of braided character because of the ease with which a braided fabric can be made to have any one of several characteristics desirable in elastic bands and especially those for use with hose. However, I do not limit myself to braided fabric in all cases.

Figure 4:
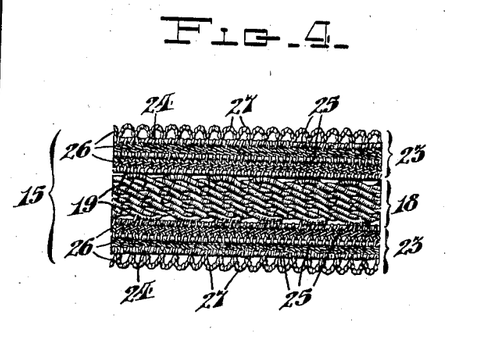
Fig. 4 is an elevation of a section of a braid within my invention as it appears in relaxed condition and on an enlarged scale.
Figure 5:
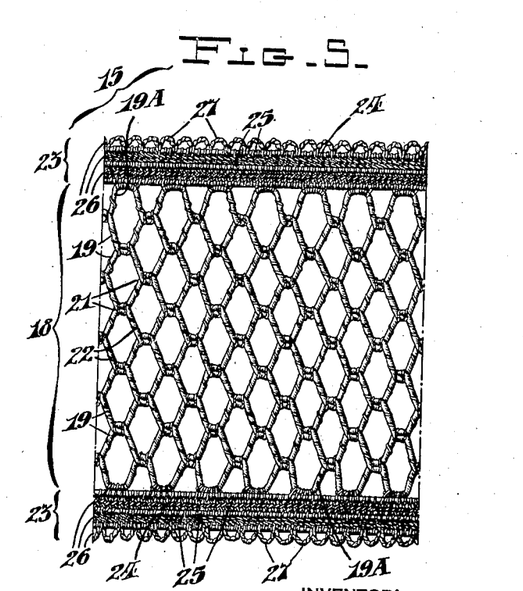
Fig. 5 is an elevation of the section shown in Figure 4 in an expanded condition.

One form of elastic fabric in accordance with my invention is shown in Figs. 4 and 5 and includes a group of elastic yarn members or elements entwined or interbraided at intervals. Each of said elastic elements follows a zigzag path and, except the ones at the edges of the group, engages with two other zigzag elements, being interbraided so as to be entwined first with one and then with the other at spaced points along its length to form an open mesh construction, in the present instance having diamond shaped openings when the fabric is stretched transversely (Fig. 5). In the particular two-way stretch band shown in Figs. 4 and 5, the said elastic elements are, however, braided under sufficient tension so that, when relaxed, the elements draw together transversely of the fabric and may close the openings substantially entirely, as shown in Fig. 4. The separately formed elastic band according to my invention therefore may appear substantially without apertures when relaxed, but will open readily to stretch transversely of its length, that is lengthwise of the stocking. The transverse stretch of the band due to its structure is, of course, greatly amplified by the fact that it is of elastic material and especially because it contracts when relaxed to the extent mentioned. While I do not limit myself to this feature in all cases, it is of considerable importance not only on account of its high degree of stretch, but because of its good appearance on the counter or in the hand. Due to the fact that the band is substantially solid when relaxed it has a high ratio of transverse stretch and a given desired amount of transverse stretch may therefore be obtained from a relatively narrow band.

A method within my invention consists in inserting between previously knitted and separate parts of a stocking a separately formed two-way stretch band, and attaching, by sewing said band to the edges of said parts. If preferred the parts to be united by the two-way stretch band may be knitted as separate parts and then united to opposite edges of the band or the parts may be knitted integrally in the ordinary way and then severed before or after attaching to the elastic band.

Figures 1, 2:
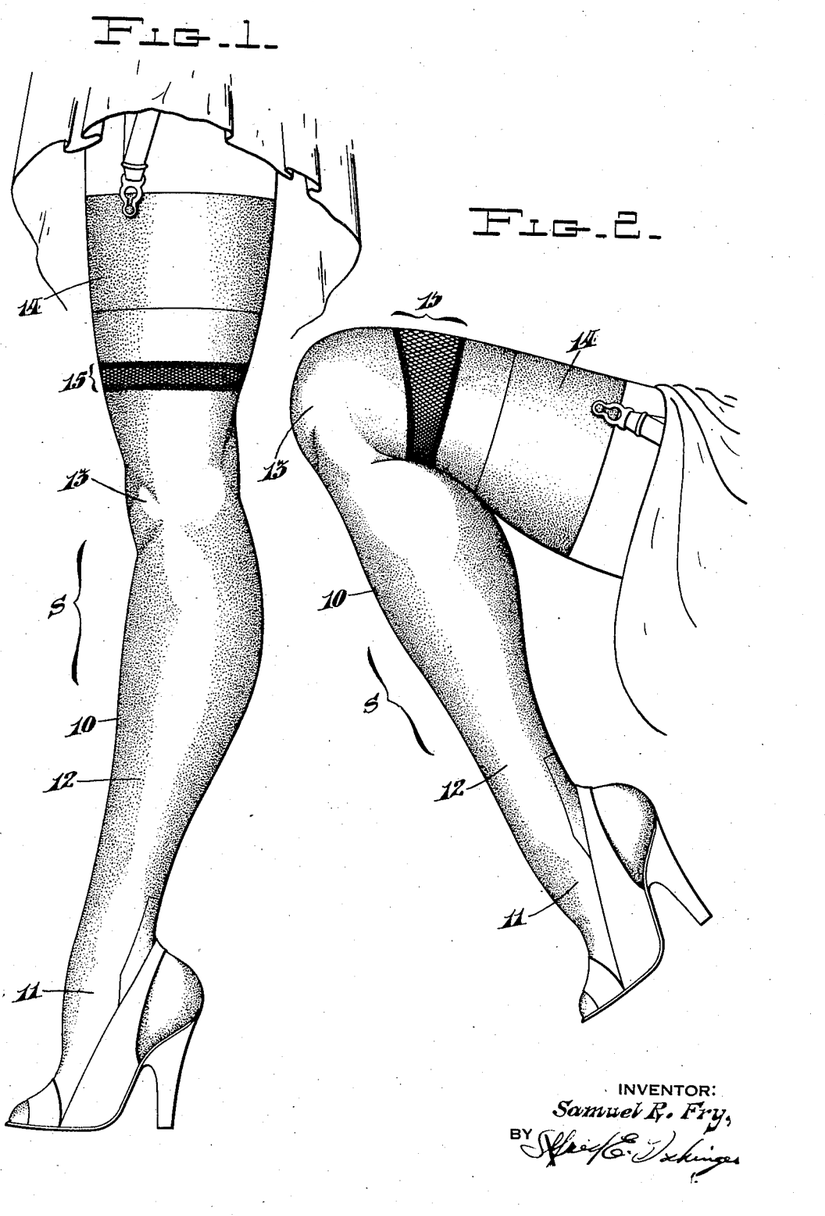
Figure 1 is an elevational view of a stocking within my invention as it appears on the wearer.
Fig. 2 is a view similar to Fig. 1 and illustrating the action of the stocking when the knee of the wearer is bent.
Figure 3:
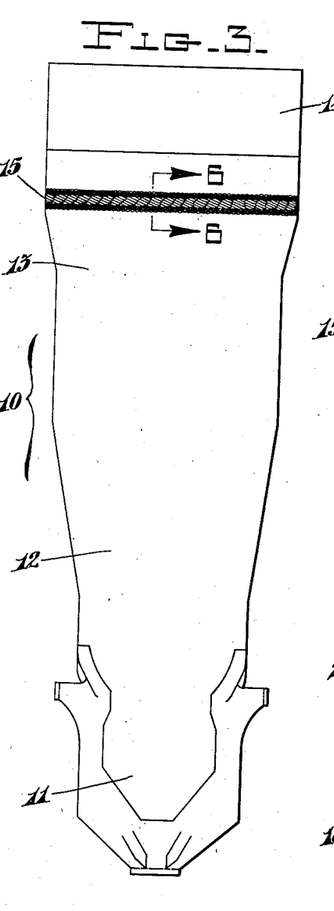
Fig. 3 is a plan view of a stocking blank from which the stocking of Figs. 1 and 2 is constructed.
Figure 6:
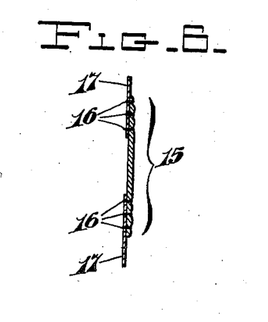
Fig. 6 is a sectional view taken substantially on the line 6—6 of Fig. 3.

A stocking S in accordance with my invention, illustrated in Figs. 1 and 2, is constructed from a blank 10 (Fig. 3) and comprises the usual foot portion 11, leg portion 12, knee portion 13 and welt portion 14. Intermediate knee portion 13 and welt portion 14 is a two-way stretch band 15. Band 15 is attached to the portions of the stocking on each side thereof by means of seams 16, close to edges 17, Fig. 6, of the stocking fabric. By this arrangement, stocking S is able to stretch from the position shown in Fig. 1 to that shown in Fig. 2 without placing undue stress on the knitted loops or stitches when the knee of the wearer is bent.

Band 15 is illustrated in detail in Figs. 4, 5, 7 and 8 and comprises a central zone 18 composed principally of yarns 19 extending generally lengthwise of the band and braided or plaited together so that each yarn 19 except the two 19A along the edges of zone 18 intertwines or engages, as at points 21 spaced longitudinally of the braid, with two others on opposite sides of it, first with one and then the other of said others, to make, as shown in Fig. 5, diamond-shaped openings when the band is extended laterally or transversely of itself, that is lengthwise or walewise of the stocking 10. The yarns 19 are elastic and may be braided or plaited under sufficient tension to cause the openings in zone 18 to substantially close, as shown in Fig. 4, when the band is relaxed. Unless means were provided to prevent it, yarns 19 would tend to slide on each other at points 21 and to prevent this, yarns 19 have wound or entwined thereon relatively fine inelastic yarns 22. Each yarn 22 follows the length of a single yarn 19, except where the given yarn 19 interengages with another. Between two successive points of engagement of yarns 19, each yarn 22 makes a turn around a yarn 19, showing once or twice depending on which side of the fabric is in view, but at the points 21, the yarns 22 wind about both of the engaging yarns 19 and thereby bind them together at such points to effectually prevent sliding of one yarn 19 on another. Yarns 19A along the edges of zone 18 interengage each with only one yarn 19, but are bound by yarns 22 at points 21 the same as yarn 19.

Along the edges of zone 18 are shown two selvage zones 23 illustrated as formed partly of closely braided or plaited inelastic weft threads 24. Weft threads 24 engage yarns 19A to attach zones 23 firmly to zone 18 and also interengage with spaced straight longitudinal elastic warp yarns 25 to form straight longitudinal needle tracks 26 which can be seamed without causing a needle to cross an elastic, thereby avoiding all danger of cutting and weakening the elastic elements by the needles. Along their free edges, zones 23 are shown as having ornamental loops 27 resembling a picot edge also of inelastic yarn and further useful as means whereby one of seams 16 may attach the band 15 to the stocking S.

Figure 7:
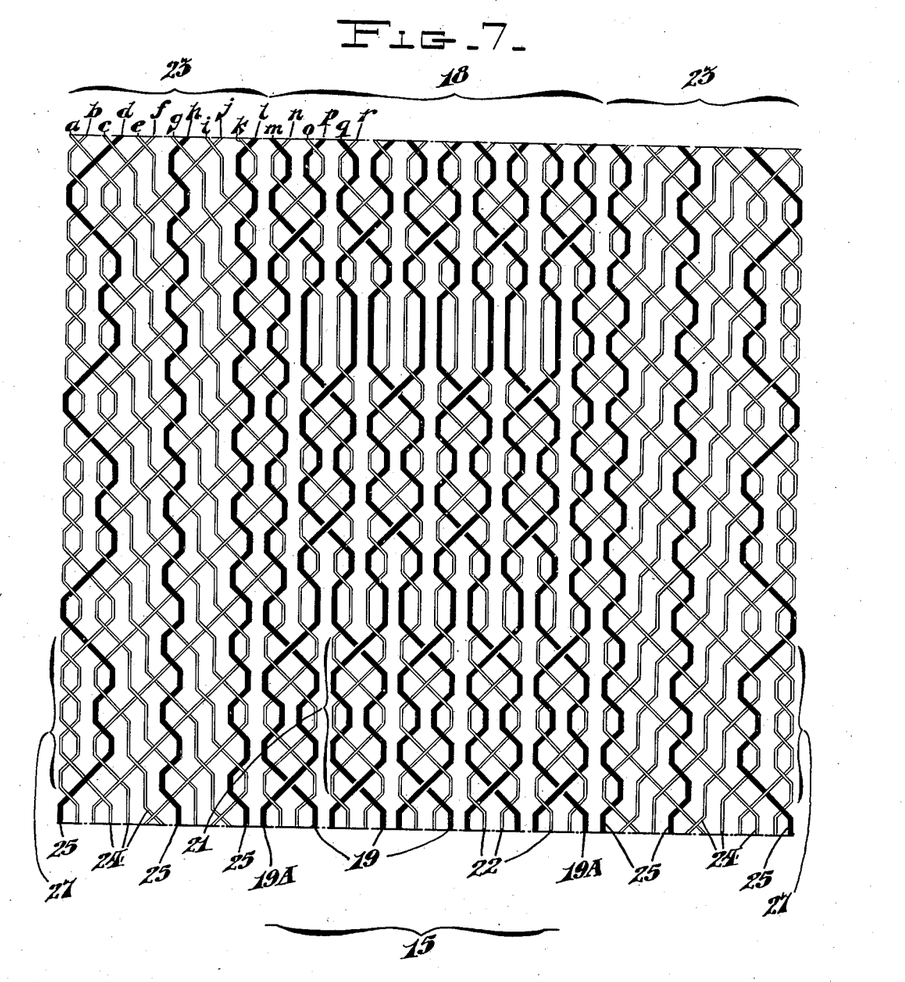
Fig. 7 is an enlarged diagrammatic view illustrating the method of interbraiding the various strands of the braid shown in Figs. 1 through 6.
Figure 8:
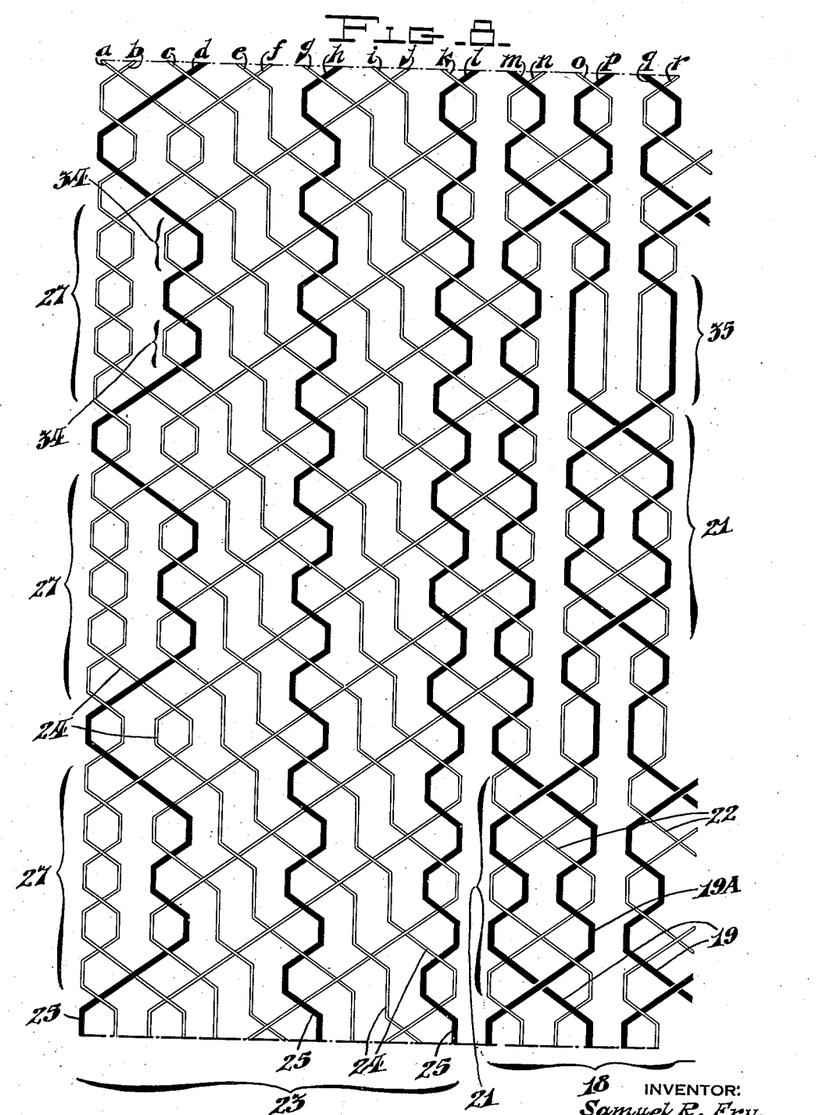
Fig. 8 is a portion of the diagram appearing in Fig. 7 drawn to an enlarged scale relative thereto.

The band 15 was made on a braiding machine, the diagram for making such braid being given in Figs. 7 and 8. In Figs. 7 and 8, the elastic yarns are indicated by heavy solid lines and the inelastic yarns by thinner double lines. As is clear in the diagram, each intermediate heavy elastic 19 crosses first one and then the other of the two on each side of it at points 21 spaced longitudinally of the band 15, and the inelastic yarns 22 associated with a pair of crossing yarns 19 are shown as enclosing both yarns 19 at points 21 to bind the yarns 19 together.

As is well known, the ordinary braiding machine includes a considerable number of thread or bobbin carriers which are moved by suitable gearing having actuating horns (not shown) in predetermined paths along raceways formed by a pair of undulatory intersecting slots 31 and 32 (Fig. 9) formed of arcs of substantially circular contours in a race plate or quoit plate 33 and forming closed paths extending around the central axis of the machine. The substantially circular quoits or tellers 30 lying between slots 31 and 32 are necessarily supported individually separately from the other sections of the plate 33. The operation of the horns and their gears can, however, be controlled by clutches (not shown), in connection with switches (not shown), so as to cause any given bobbin carrier to travel only any desired portion of the distance possible in the given machine. It will be understood that those skilled in the art are able, from a diagram like Figure 8, to control the operation of the horns to make a braid as represented by said diagram. In other words, the mechanism can be designed to switch any bobbin carrier over from slot 31 to slot 32 to reverse its course at any intersection to thereby predetermine the overall length of path of any given bobbin, as well as to give additional minor traverses, one or more tellers in length, at desired points in the cycle. Bobbin carriers for threads travelling clockwise around the axis of the machine will be set to move in one path or slot, say 31, and those travelling counterclockwise set to move in slot 32. There is, therefore, no difficulty in arranging the carriers so as to pass each other as desired. Where two bobbin carriers pass each other, they are necessarily travelling along different slots, and going in different directions. If the passing occurs in the half undulations or with the carriers at the ends of their respective paths, they entwine in a short twist as indicated at 34, but they make a long twist, not so easily followed, if the passing occurs farther from the ends of their paths. Where two short twists 34 occur at a minimum interval in a yarn whose carrier is shown to traverse across several tellers, the reason is that the bobbin carrier is at times revolved more than once in succession around the teller at one end of its path. The horns and switches can be arranged to produce this effect when desired and it is particularly noticeable in the case of yarn d. Further, a bobbin carrier may be held stationary by the horns for a revolution to maintain a desired sequence of the bobbin carriers with the result that a special long twist 35 is produced which is quite noticeable on the diagram although not readily perceptible in the fabric. Apparatus containing the switches and clutches hereinabove referred to are well illustrated in the patents to Rahm, Nos. 1,182,037 and 1,282,944.

Figure 9:
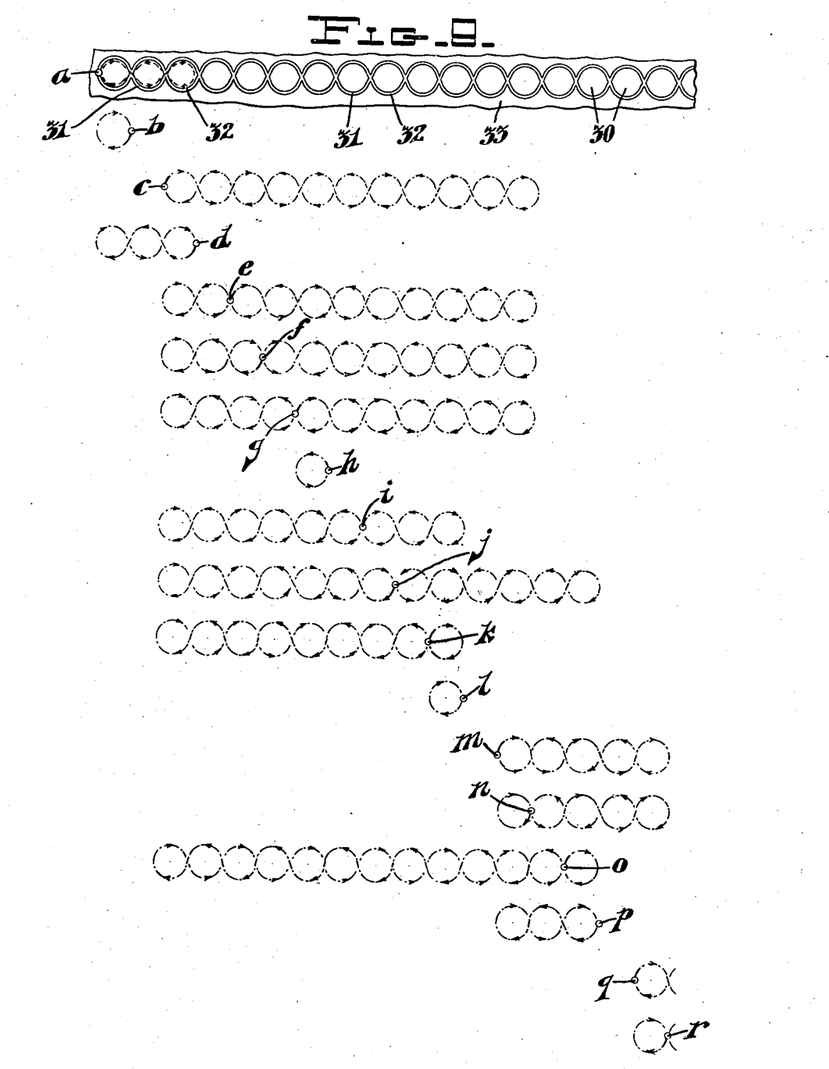
Fig. 9 is a schematic view of a portion of the raceways of a braiding machine, together with diagrams of the paths taken by the bobbins and their carriers in making the portion of the braid diagramed in Fig. 8.
Figures 10, 11:
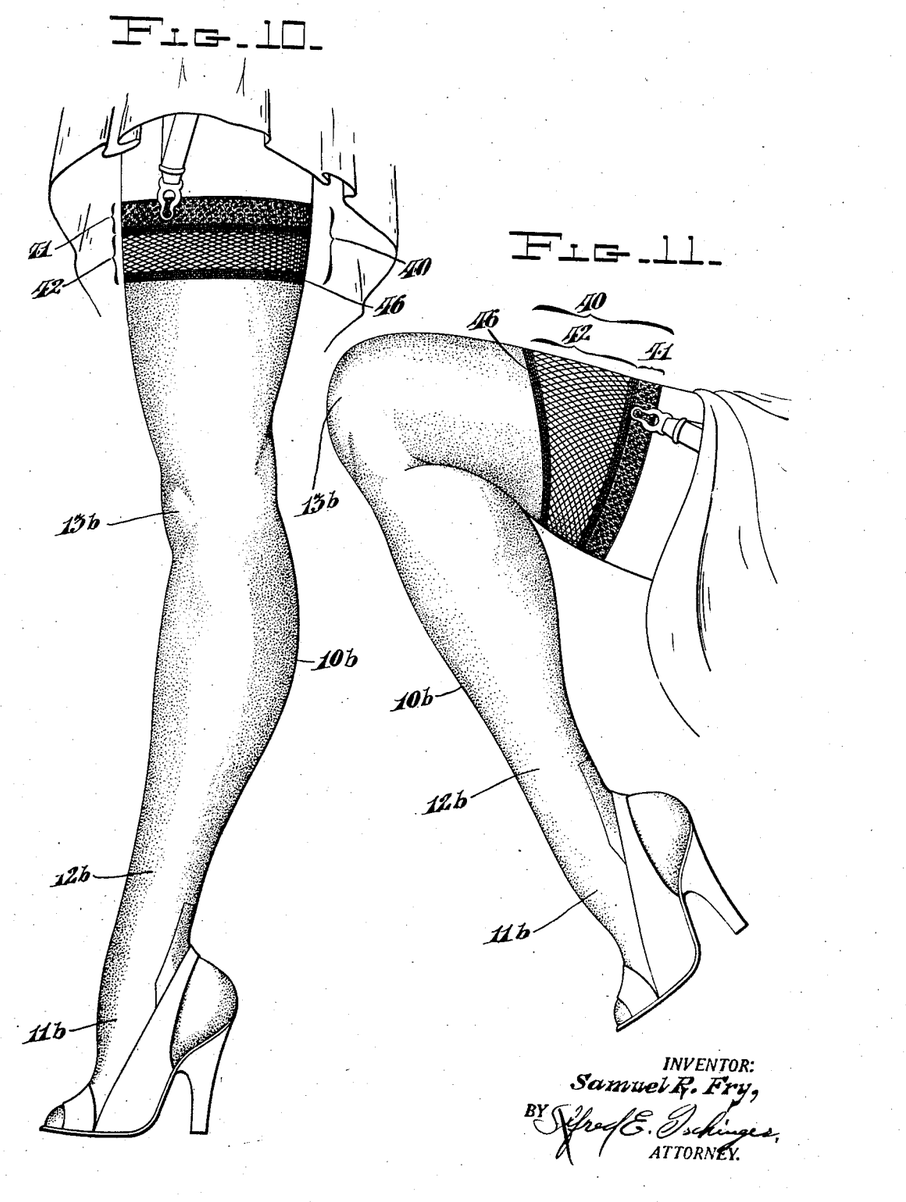
Fig. 10 is a view of a stocking having another form of two-way stretch elastic band incorporated therewith and shown as it appears on the wearer.
Fig. 11 is a view showing the same stocking as Fig. 10, but as it appears when the wearer assumes a different position from that shown in Fig. 10.
Figure 12:
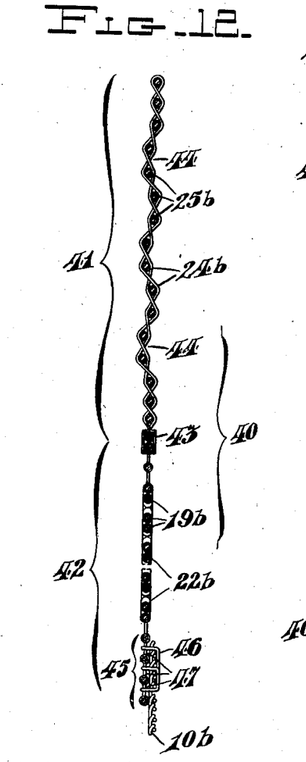
Fig. 12 is a cross-section through the elastic band shown in Figs. 10 and 11 and the upper edge of the knitted portion of the stocking but showing the band in the relaxed form of Fig. 13.
Figure 13:
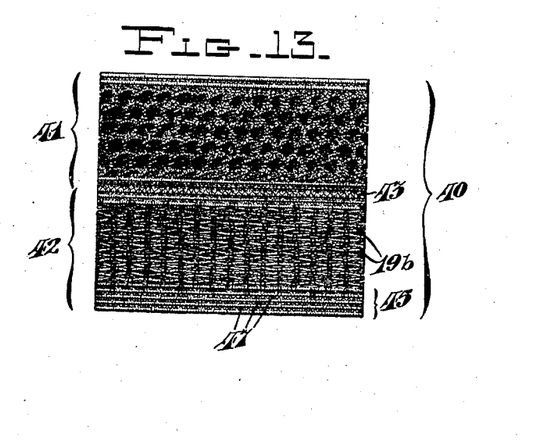
Fig. 13 is a plan view of a short section of the band shown in Figs. 10, 11 and 12 in the relaxed condition.
Figure 14:
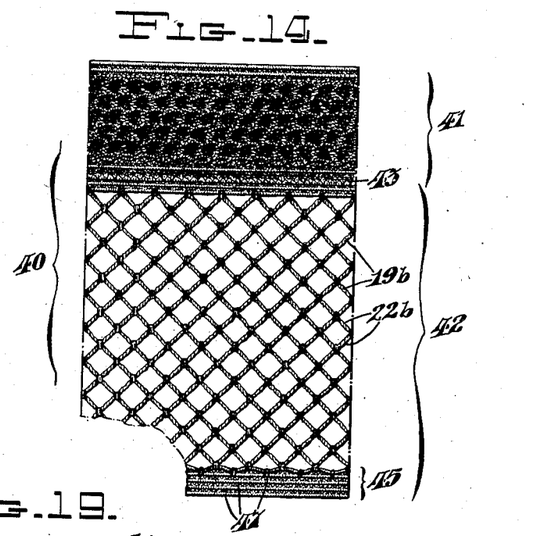
Fig. 14 is a view similar to Fig. 13, but with the band stretched transversely.

In Fig. 8, I have shown on an enlarged scale the braiding diagram of a representative strip of braid 15 extending from one edge inwardly a distance indicated on Fig. 7 and embracing eighteen threads lettered a to r, respectively. In Fig. 9, I have shown schematically, the paths of the bobbin carriers for the same group of threads as they are placed relatively to each other at some given instant of time, the bobbin carriers being shown in Fig. 9 as small circles and lettered correspondingly to the threads shown in Fig. 8. In Fig. 9, the paths of the bobbin carriers are indicated by eighteen diagrams, in each of which the bobbin carrier lies at a point of intersection between paths 31 and 32. The path of each bobbin carrier is shown in Fig. 9 in dot-and-dash lines, that of carrier a being shown on the portion of Fig. 9 containing the portion of plate 33 and slots 31 and 32.

As shown, the path of carrier a includes one and one-half undulations of slot 31, a length of three tellers, in one direction and one and one-half undulations of path 32 in the reverse direction, being thereby limited to a narrow strip along the selvage of the braid. The path of bobbin carrier b includes only one-half of an undulation, one teller, in one direction and one in the reverse direction, its traverse being therefore of minimum extent and essentially circular. Bobbin carrier c follows a path including five and one-half undulations of slots 31 and 32, eleven tellers, in each direction, while bobbin carrier d imitates carriers a in having a path of one and one-half undulations in each direction.

It will be seen that bobbin carriers a, b and d have paths touching or lying in one extreme edge of the braid 15. Yarns a and b therefore entwine to make picot loops as indicated at 27 on Fig. 8 and at intervals the outer heavy elastic yarn d (one of yarns 25 of Fig. 5) entwines with yarns a and b to bind the loops 27 to the remainder of selvage 23. Bobbin carrier c, however, overlaps a half undulation with a and d and its path runs inwardly far enough so that yarn c not only assists in building the selvage 23, but also assists in tying the selvage to the central portion 18 of the braid. The bobbin carriers e, f and g have the same traverse as bobbin carrier c and they all also lay inelastic yarns. The middle yarn of the group of elastic yarns 25 in a selvage section 23 is laid by bobbin carrier h which is like bobbin carrier b in having a circular path with a throw of only one-half an undulation. This elastic therefore makes a straight line in the braided fabric. The yarn laid by bobbin carrier b, however, appears in loop form in the fabric. The reason why yarns laid by bobbin carriers, as for example b and h, having the same form of path do not always lie the same in the fabric is that in one instance the inelastic yarn from bobbin carrier b is entwined with the heavy elastic laid by carrier d, whereas heavy elastic yarn is fed from the carrier h. Thus the yarns from d and h are fed under sufficient tension so that they pull themselves straight when released from the machine; the elastic yarn from carrier d thereby pulls the two inelastic yarns from bobbin carriers a and b into loops along the edge of the fabric.

The group of bobbin carriers i, j and k shown in Fig. 9 intermediate carriers h and l lay inelastic yarns helping to form the selvage section, carriers i and k having paths beginning the same distance from the edge as those of bobbin carriers e, f and g and therefore entwining with the outermost heavy elastic yarn laid by carrier d. Bobbin carriers i and k, however, do not have as wide a traverse as carriers c, e, f and g, while carrier j has an even wider traverse, its path extending into the mid-section 18 of the braid 15 to a greater extent than the carriers c, e, f and g so that it also assists in tying the selvage to the mid-section.

Bobbin carrier l, like b and h, has a traverse or throw of only one-half an undulation or one teller. This carrier lays the innermost heavy elastic of the selvage section. As is clear from Fig. 9, its path overlaps those of carriers c, e, f, g, i, j, k and o and the yarn laid by it therefore entwines with the yarns laid by all these bobbin carriers.

As above indicated, all the three heavy elastic yarns in a given selvage section lie straight in the finished fabric so as to form the tracks 26 for facilitating attaching of the fabric to the article of apparel.

Bobbin carriers m, n, p, q and r have paths of varying lengths, but all lay yarn in the central section 18 of the braid. Bobbin carrier p lays the elastic yarn 19A which defines the edge of the section 18 and it entwines only with one other elastic 19, that laid by the carrier m.

In Figs. 10 to 16 is shown another type of elastic band for stockings and one having a composite character; in these figures portions corresponding to those shown in the previous figures are designated by similar reference characters having the letter b affixed thereto. In Figs. 10 to 15, the band is designated as a whole by reference numeral 40, but is formed in two initially separate parts 41 and 42. Part 41 is preferably a braid and part 42 is preferably a warp knit fabric and the two parts are connected together to form a unitary band by a seam structure 43. The juxtaposed edges of portions 41 and 42 are so formed and the stitches of seam 43 are so arranged that the line of juncture between the parts 41 and 42 is very inconspicuous, giving the two parts the appearance of a unitary band. The seam 43 in the present instance is produced by means of a sewing operation, although fagoting, crocheting, knitting etc., may obviously be employed to advantage to connect the parts 41 and 42 to each other. The reason for making part 41 on a braiding machine is that this is best adapted to give part 41 the particular group of characteristics desired for the upper part of such bands. The upper part 41 is desirably without interstices so that it shall have very little walewise stretch but shall have high strength, to resist the hard usage to which the upper ends of stockings are subjected, but at the same time have considerable coursewise stretch and indentations of surface to largely increase the adhesion of the part to the leg for a given tension of the circumferential elastics and thereby obtain a highly efficient garter action.

The lower part 42 of band 40 is preferably made on a raschel or warp knitting machine. It has approximately the same coursewise or circumferential stretch as part 41, but a very high walewise stretch due in part to the netlike arrangement of its main yarn elements 19b and in part to the fact that elements 19b are of elastic yarn. The elastic yarns 19b are covered in part by smaller inelastic yarn elements 22b which also serve to tie the elastics 19b together at the corners of the square apertures in the net.

It will be noticed that portion 42 of fabric or band 40, like section 18 of band 15, is so fabricated that its main yarn elements draw close together when it is relaxed so that it is then substantially imperforate. This is not only an advantage in improving the appearance of the hose when exhibited on the show case or counter but in providing an increased ratio of transverse or walewise expansion in use. This effect is produced primarily by tensioning the elastic yarns sufficiently during fabrication of the net portions.

The braided portion 41 of band 40 has longitudinal elastics 25b therein whereby portion 41 has a garter action. Portion 41 has, however, closely braided weft threads 24b running transversely therein making portion 41 a tight or imperforate fabric and substantially inelastic in the transverse or walewise direction. It can therefore withstand readily the severe usage sometimes applied to the upper edges. Portion 41 is specially formed, however, to have a series of indentations 44 whereby it has an interengaging or gripping action on the flesh of the wearer, thereby increasing its efficiency as a garter and permitting the tensioning action of elastics 25b to be less than that of garter fabrics heretofore provided for this purpose.

Obviously, portion 42 also has a gripping or interengaging action on the flesh due to the openings therein in use. Owing to its high transverse elasticity, portion 42 can stretch to minimize a transverse pull on portion 41 without itself losing its engagement with the flesh as will be clear from Fig. 11. When band 40 is to be applied to a hose it may be topped onto the needles of the knitting machine, but the band illustrated has a special selvage portion 45 whereby the band may be readily sewed to the top of a knitted blank for a stocking 10b by an ornamental seam 46. As is plain from Figs. 13 and 14, part 45 has straight seaming tracks 47 intermediate heavy elastic yarns so that there is no need or danger of cutting an elastic in making seam 46.

Figure 15:
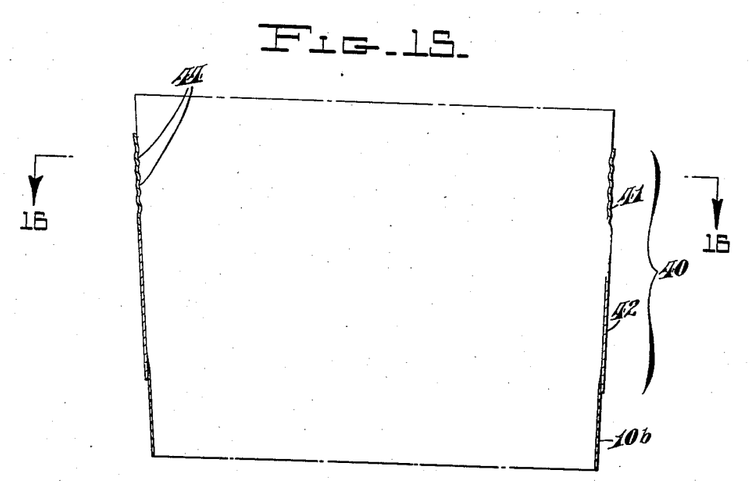
Fig. 15 is a longitudinal sectional view through both sides of the band shown in Figs. 10 and 11 and the upper edges of the knitted portion of the stocking when in use and illustrating the coaction between the band and the flesh of the wearer.
Figure 16:
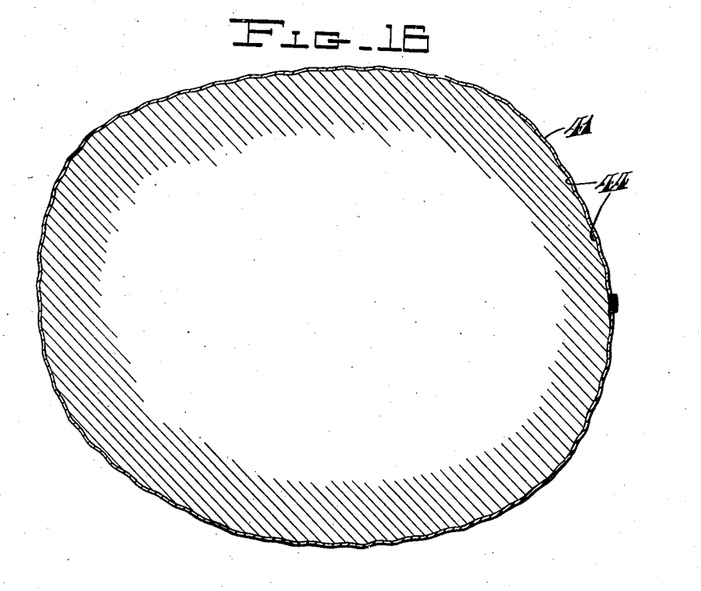
Fig. 16 is a cross-section taken substantially on the line 16—16 of Fig. 15.

The garter action of portion 41 when in use on a stocking and the effect of indentations 44 in interengaging with the flesh are well shown in Figs. 15 and 16.

In the practical embodiment of my invention shown in Figs. 10, 11, 12, 15 and 16 and including the portions 41 and 42 of band 40, both portions have substantially 100% elasticity coursewise or circumferentially of the stocking and lengthwise of the band, while portion 41 has very little if any elasticity walewise or lengthwise of the stocking and transversely of the band, but portion 42 has 200% or more stretch walewise or longitudinally of the stocking and transversely of the band in the net between the seams 43 and 46. Similarly, the band 15 shown in the embodiment of the invention according to Figs. 1 and 2 has a percentage of stretch of 200% or more in the net between the two seaming edges.

Figures 17, 18:
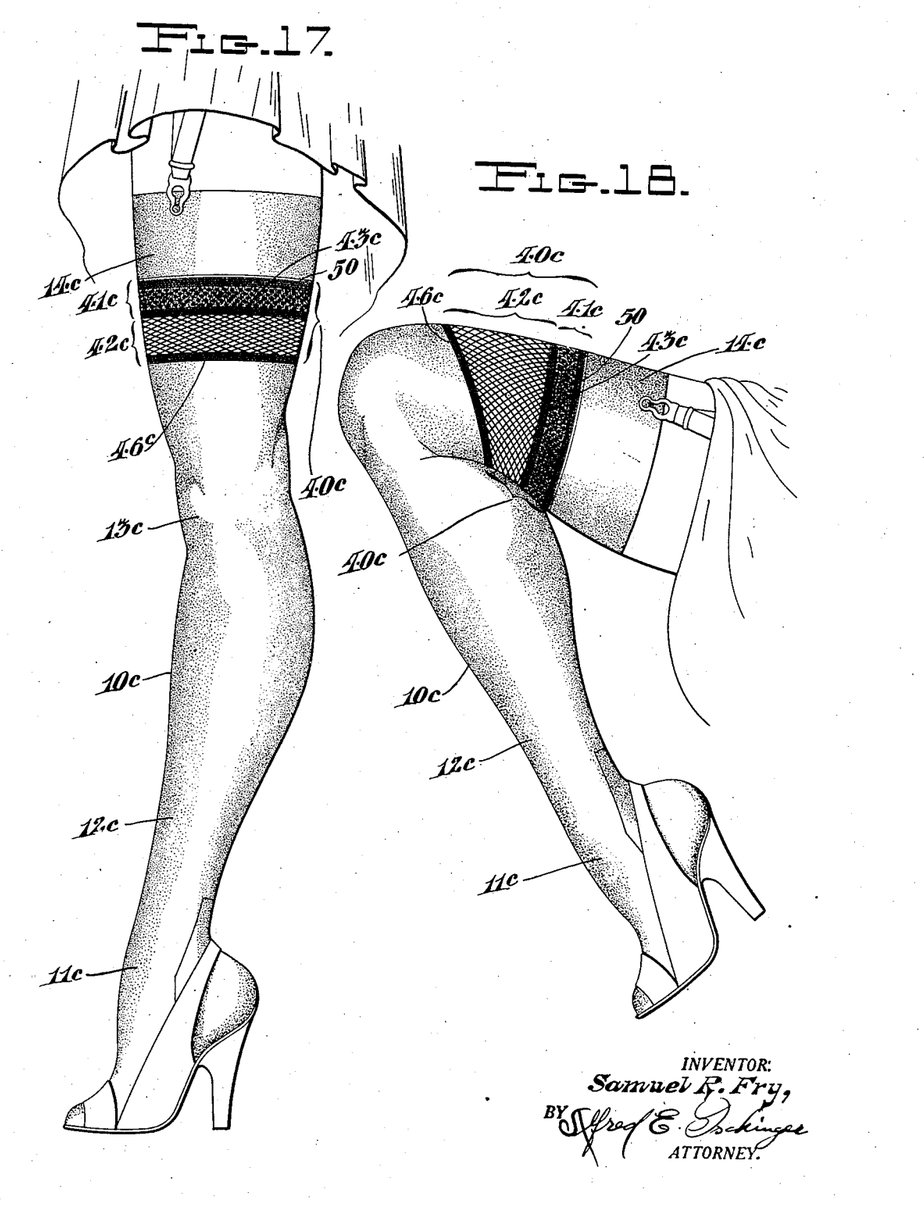
Figs. 17 and 18 are views similar to Figs. 1 and 2, but showing an elastic band like that of Figs. 10-14 used as an insert.

In the embodiment of the invention shown in Figs. 17 and 18, portions corresponding to those shown in Figs. 1 to 16 are designated by similar reference characters having the letter c suffixed thereto; thus the elastic band 40c is essentially similar to band 40 and includes a braided portion 41c but the net portion 42c is not a warp knit or like fabric but is a braid. Band 40c, however, is shown as used intermediate a welt portion 14c and a knee portion 13c of a stocking 10c which includes also the usual foot portion 11c and leg portion 12c. Portions 41c and 42c are like and are adapted to act the same as portions 41 and 42, respectively. Therefore, it is feasible, as indicated in Figs. 17 and 18 to connect the upper or welt portion 14c of stocking 10c to the preformed band portion 41c by a sewed seam 50 and to connect the knee part 13c of the lower portion of stocking 10c to the preformed band portion 42c by a sewed seam 46c, parts 41c and 42c being connected by a sewed seam 43c formed either before or after seams 46c and 50 have been made. In making stocking 10c, however, it is permissible that, after portion 42c has been topped onto the needles and the portions 13c, 12c and 11c knitted thereto, the welt portion 14c is then knitted and braided portion 41c attached either by knitting or sewing at seam 50. The welt 14c having portion 41c attached thereto is then knitted, crocheted, sewed, or otherwise attached to the lower portion of the stocking 10c along the seam 43c, thereby completing the stocking. The portions 41c and 42c may also be sewed or otherwise joined together to form the band 40c prior to their being attached to the stocking portions 13c and 14c, thereby providing a unitary band structure from materials of different characteristics, which band can be used, for example, as a welt in articles of wearing apparel such as hosiery and the like, or as an insert material in such articles. The welt portion 14c is of the usual two ply or turned type and the stockings shown in Figs. 17 and 18 are not provided with any substantial amount of afterwelt connecting the two ply welt 14c with the one way stretch elastic section 41c. However, I do not limit myself as to the use or omission of a substantial afterwelt between the elastic zone 40c and the welt proper 14c.

Figure 19:
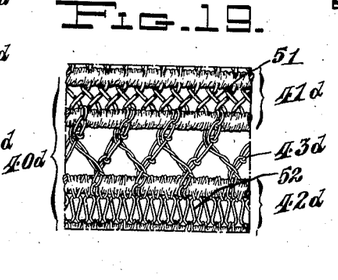
Fig. 19 is a view similar to Fig. 14, showing on an enlarged scale a portion of a fabric in which an openwork seam structure is employed to connect the separately formed fabrics.
Figure 20:
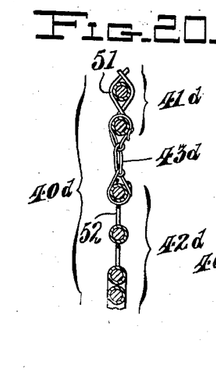
Fig. 20 is a sectional view, similar to Fig. 12, taken through Fig. 19.

In the fabric shown in Figs. 19 and 20, portions corresponding to fabric of the remaining figures are indicated by similar reference characters having the letter d suffixed thereto. Although only a small portion is shown, the fabric 40d is generally constructed similar to the fabric shown in Figs. 13 and 14, differing therefrom in the respect that the portions 41d and 42d, instead of being connected together by a closed seam structure, are joined together by means of an openwork structure 43d which in the present instance is effected by means of a stitch known as "fagoting." This fagoting stitch formation, in addition to producing a decorative seam structure, also effects spacing between the separately formed band portions which permits adjustment of the one portion relative to the other. This arrangement also effects a relatively thin seam which is particularly desirable in articles of this type. Further, the portions 41d and 42d having openwork sections 51 and 52 respectively adjacent the edges of said portions and the seam 43d being itself an openwork structure, the seam appears so much like the sections near it as to be indistinguishable, except on close inspection. Although a fagoting stitch is here disclosed as being particularly adapted to join two band portions together to form a structure in accordance with the present invention, obviously various other stitch formations can be employed to advantage.

While specific fabrics have been described as forming sections of elastic bands 40, 40b and 40c, as above indicated, the sections or portions 41, 41b and 41c may be either braided, warp knitted or woven and the portions 42, 42b and 42c may also be either braided, warp knitted or woven, while a section 41 of any one type of fabric may be used with a section 42 of the same or any other type of fabric and section 42 of any one type of fabric may be used with a section 41 of the same or any other type of fabric.

Of course, the improvements specifically shown and described by which I obtain the mentioned results, can be changed and modified in various ways without departing from the invention herein disclosed and hereinafter claimed.

I claim as my invention:

1. An elastic band having two way stretch and having a braided part and a warp knit part, fastened together along adjoining edges, said warp knit part having a portion of net fabric including elastic main yarns and having at least two hundred per cent stretch transversely of the band.

2. An elastic band as set forth in claim 1 and having the adjoining edges of the two parts connected by a substantially invisible seam.

3. An elastic band as set forth in claim 1 and having the adjoining edges of the two parts connected by a substantially invisible seam and having seaming tracks along an unattached edge.

4. A stocking composed of upper and lower sections connected together and each including a portion knitted of inelastic yarn and an elastic portion joined by a seam.

5. The method of making a stocking having a two way stretch portion above the knee comprising topping on to the needles of a full fashioned knitting machine a separately formed elastic section having two way stretch, knitting to said section the portions of the stocking extending from above the knee through the toe, knitting a welt, connecting a one way stretch elastic section to said welt, and connecting said two elastic sections to complete the stocking.

6. An elastic fabric for use in garments and composed of upper and lower sections connected together and each including an edge portion for connection to the garment and an elastic portion, each of said elastic portions having an openwork section adjacent the edge remote from the said first mentioned edge and an openwork seam connecting the edges of said elastic portions between their said openwork sections.

7. An elastic fabric for use in garments and composed of two sections, each of said sections including an edge portion for connection to the garment and an elastic portion, and a seam connecting said sections and simulating adjacent portions of said sections.

8. A full-fashioned stocking composed of upper and lower sections connected together by a seam, said lower section including a lower portion knitted of inelastic yarn and a preformed elastic portion joined by a seam, and said upper section including an upper portion knit of inelastic yarn and a preformed elastic portion joined to said upper portion by a seam, one of said preformed elastic portions having only a slight degree of stretch in the walewise direction and having cup-shaped depressions adapted to increase the garter action of the portion while the other of said preformed elastic portions has two-way stretch.

9. The method of making stockings having a one-way stretch elastic portion and a two-way stretch elastic portion comprising providing an upper knitted portion of a stocking separate from a lower knitted portion providing one and two-way stretch preformed elastic band portions and combining said two preformed elastic portions with the edges of said knitted portions to form a stocking by steps including at least two seams.

10. A stocking comprising upper and lower knitted sections and an intermediate section having a one-way stretch elastic portion and a two-way elastic portion and means connecting said knitted sections and said elastic portions together to form the stocking including at least two seams.

SAMUEL R. FRY.